United States Patent
Weber

(10) Patent No.: US 10,055,417 B2
(45) Date of Patent: *Aug. 21, 2018

(54) CENTRALIZED PARALLEL BURST ENGINE FOR HIGH PERFORMANCE COMPUTING

(71) Applicant: DataDirect Networks, Inc., Chatsworth, CA (US)

(72) Inventor: Bret S. Weber, Wichita, KS (US)

(73) Assignee: DATADIRECT NETWORKS, INC., Chatsworth, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/406,103

(22) Filed: Jan. 13, 2017

(65) Prior Publication Data

US 2017/0177598 A1    Jun. 22, 2017

Related U.S. Application Data

(63) Continuation of application No. 14/078,854, filed on Nov. 13, 2013, now Pat. No. 9,558,192.

(51) Int. Cl.

| H04L 12/803 | (2013.01) |
|---|---|
| H04L 12/26 | (2006.01) |
| G06F 17/30 | (2006.01) |
| G06F 9/48 | (2006.01) |
| G06F 9/50 | (2006.01) |

(52) U.S. Cl.
CPC .. *G06F 17/30091* (2013.01); *G06F 17/30129* (2013.01)

(58) Field of Classification Search
CPC .............. H04L 47/125; H04L 43/0882; G06F 17/30091; G06F 2009/45579; G06F 9/4881; G06F 9/505

See application file for complete search history.

(56) References Cited

U.S. PATENT DOCUMENTS

| 5,598,376 | A | * | 1/1997 | Merritt | ................ | G06F 12/0638 |
|---|---|---|---|---|---|---|
| | | | | | | 365/189.05 |
| 5,729,503 | A | * | 3/1998 | Manning | .............. | G11C 7/1024 |
| | | | | | | 365/189.05 |
| 5,966,546 | A | * | 10/1999 | Thomas | ................ | G06F 13/387 |
| | | | | | | 709/250 |
| 6,006,289 | A | * | 12/1999 | James | ................. | G06F 13/4059 |
| | | | | | | 370/431 |
| 6,525,971 | B2 | | 2/2003 | Merritt | | |

(Continued)

*Primary Examiner* — Edward Kim
(74) *Attorney, Agent, or Firm* — Marsh Fischmann & Breyfogle LLP; Russell T. Manning

(57) ABSTRACT

Data storage systems and methods for storing data are described herein. An intermediate storage system is coupled with a High Performance Computing (HPC) system. A plurality of burst engines of the intermediate storage system are directly connected to compute nodes of the HPC. The burst engines are operative to receive file level data from the compute nodes at data transfer rates that at least match to the burst mode output rate of the compute node. The burst engines store the data to high bandwidth storage devices of the intermediate storage system at a data rate that at least matches the burst output rate of the compute node. During a compute phase of the compute node, data is replayed from the intermediate storage devices to a primary storage system at a lower data transfer rate.

7 Claims, 7 Drawing Sheets

(56) References Cited

U.S. PATENT DOCUMENTS

| | | | |
|---|---|---|---|
| 7,085,849 B1* | 8/2006 | Clark | H04L 47/10 |
| | | | 370/235 |
| 7,610,357 B1* | 10/2009 | Chandrachood | H04L 41/0213 |
| | | | 709/217 |
| 7,646,654 B2 | 1/2010 | Merritt | |
| 7,707,366 B2* | 4/2010 | Tagawa | G06F 13/1647 |
| | | | 711/105 |
| 8,250,574 B2 | 8/2012 | Baba | |
| 8,683,182 B2* | 3/2014 | Hansen | G06F 9/30014 |
| | | | 712/16 |
| 8,706,915 B2 | 4/2014 | Duchesneau | |
| 9,401,960 B2 | 7/2016 | Chang | |
| 2002/0001234 A1* | 1/2002 | Merritt | G06F 12/0638 |
| | | | 365/189.05 |
| 2008/0259696 A1* | 10/2008 | Merritt | G06F 12/0638 |
| | | | 365/189.05 |
| 2009/0216910 A1* | 8/2009 | Duchesneau | G06F 9/5072 |
| | | | 709/250 |
| 2010/0175070 A1* | 7/2010 | Baba | G06F 9/505 |
| | | | 718/105 |
| 2012/0179874 A1* | 7/2012 | Chang | G06F 9/45558 |
| | | | 711/128 |
| 2013/0306276 A1* | 11/2013 | Duchesneau | G06F 9/5072 |
| | | | 165/104.21 |
| 2013/0346557 A1* | 12/2013 | Chang | G06F 9/45558 |
| | | | 709/217 |
| 2015/0134780 A1 | 5/2015 | Weber | |

\* cited by examiner

CENTRALIZED PARALLEL BURST ENGINE FOR HIGH PERFORMANCE COMPUTING

CROSS REFERENCE

The present application is a continuation of U.S. patent application Ser. No. 14/078,854 having a filing date of Nov. 13, 2013 and which issued as U.S. Pat. No. 9,558,192 on Jan. 31, 2017, the entire contents of which are incorporated herein by reference.

FIELD OF THE INVENTION

This disclosure relates to data storage in a data storage system and an improved architecture and method for transferring data between a high performance computing system and a data storage system.

BACKGROUND

High Performance Computing (HPC) systems, sometimes referred to as supercomputers, typically include a plurality of compute nodes each having one or more processing units or cores. More typically, such HPC systems include hundreds or even thousands of cores that may be distributed across a network or placed in a close proximity to one another (e.g., in a computer cluster). Such HPC systems are used for a wide range of computationally intensive applications in various fields, including, without limitation, quantum mechanics, weather forecasting, climate research, oil and gas exploration, molecular modeling and physical simulations.

The multiple compute nodes of a HPC system typically operate independently and periodically output information in a burst mode. The faster the burst, the higher the performance of the application. The burst output is typically stored to an enterprise level storage architecture. Due to the independent operation of the compute nodes, data output to the storage architecture may encounter different levels of congestion. Such congestion may result in variability in the data transfer latency or speed of individual, blocks, packets, or other data units. Should variability exceed specified tolerances, a receiving device (e.g., storage architecture) may experience slower performance or bottlenecking while receiving data. Stated otherwise, the independent operation of the compute nodes can result in jitter, which reduces the data transfer rate to the storage architecture.

One current storage approach for HPC systems is to provide a storage architecture (e.g., parallel file system) that provides enough bandwidth to sustain a 100% duty cycle burst (i.e., simultaneous burst of all compute nodes). This is to ensure that write bandwidth is available when the compute nodes are ready to dump accumulated computations. This approach provides a brute force solution by using hundreds of, for example, conventional 20 GB/S block storage machines behind a parallel file system. The volume of storage machines required to provide the necessary bandwidth causes many infrastructure problems, including management logistics, mean time between failure (MTBF) issues, power infrastructures and cabling.

While such an approach works, it is inefficient and is typically cost prohibitive to design for a desired maximum bandwidth. As a result, users will typically limit their purchase and live with poorer performance.

SUMMARY

The present disclosure provides a mechanism and methodology to sustain bursts from compute nodes at maximum data rates independently of simultaneous demand. This data is then replayed to a parallel file system during the compute phase of the compute nodes. That is, it has been recognized that compute nodes of HPC systems alternate between burst output phases and compute phases and temporarily storing the burst output of the compute nodes allows for replaying these outputs at a slower rate to primary storage during the compute phase.

In one aspect, a system, apparatus, method and/or software product (i.e., utility) is provided for transferring data between compute nodes of a high performance computing (HPC) system and a primary storage system. More specifically, data output by a HPC compute node is temporarily stored in a temporary or intermediate storage system that accommodates the high data output rates during the burst output phase of the HPC while permitting subsequent replay of the data to the primary storage system during the compute phase of the HPC. The utility includes providing a software client at the compute node of the HPC that is operative to capture file level data during the burst output phase. This client is operative to transfer the file level data and its associated metadata, via an I/O node of the compute node, at a high speed data rate (e.g., first data rate) to the intermediate storage system. A burst engine including a controller and internal memory, at the intermediate storage system, receives the file level data and associated metadata via a front-end interface that accommodates (e.g., equals or exceeds) the data transfer rate from the compute node. Upon receiving the file level data and associated metadata, the controller is configured to write the file level data and associated metadata as block level data via a back-end interface connected to a set of storage devices. This block level data may be written with redundancy calculated by the controller and/or dedicated hardware. Such storage devices may include high bandwidth storage devices including, without limitation, solid-state drives (SSDs). The back-end interface accommodates a data transfer rate that matches or exceeds the data transfer rate from the compute node. Further, the aggregate data transfer rate of the storage devices equals or exceeds the aggregate data transfer rate from the compute node(s) connected to the burst engine. Accordingly, the burst engine is operative to write the file level data and associated metadata to the storage devices as block level data without any blocking or waiting during the burst output phase of the compute node(s). A server associated with the intermediate storage system is subsequently notified that block level data has been written to the storage devices. This server is then operative to retrieve the block level data from the storage devices, interpret the metadata and replay the data to the primary storage system in accordance with the metadata. Further, the server is operative to replay the data during the compute phase of the compute node such the data may be replayed at a slower data transfer rate to accommodate the slower data transfer rate of the primary storage system (e.g., parallel file system).

In order to increase the data transfer rate from the compute node to the burst engine, the file level data and associated metadata, which identifies where the data is to be stored in the primary storage system, are stored as block level data without reference to the metadata. Upon notifying the server that data has been written to the storage devices (e.g., notifying the server of the logical block addresses (LBAs) of the data in the storage devices), the server is operative to retrieve the data and interpret the metadata. The server then replays the data to the primary storage system in accordance with the metadata.

DETAILED DESCRIPTION

Figure 1:
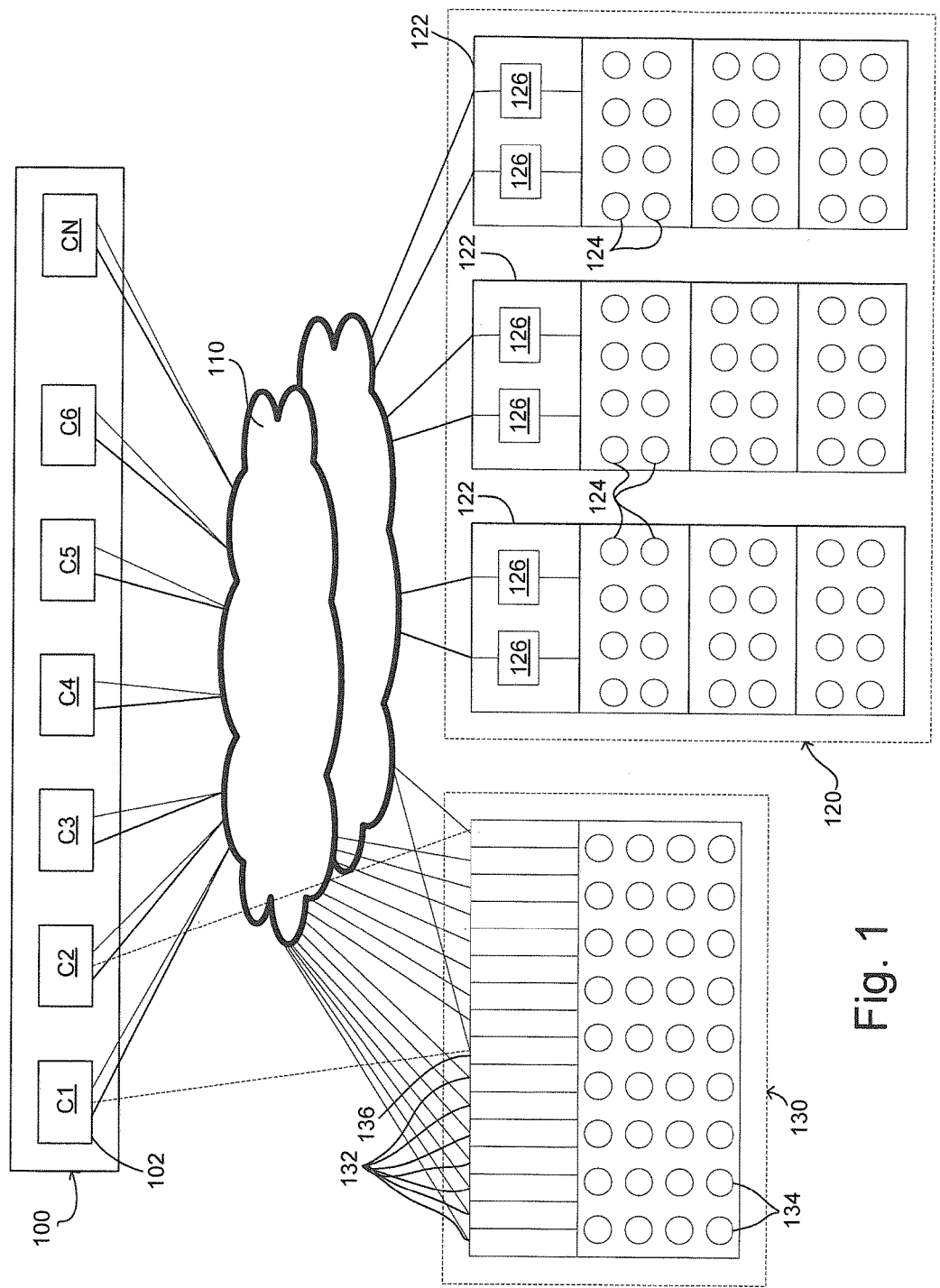
FIG. 1 illustrates a HPC system connected to an intermediate storage system and a primary storage system.

While the presented inventions are susceptible to various modifications and alternative forms, specific embodiments of the inventions have been shown, by way of example, in the drawings and will herein be described in detail. Those skilled in the art will appreciate that the features described below can be combined in various ways to form multiple variations of the inventions. As a result, the inventions are not limited to the specific examples described below, but only by the claims and their equivalents.

High Performance Computing (HPC) systems, sometimes referred to as supercomputers, generate large volumes of data, which is typically stored to one or more enterprise level storage devices or HPC storage architectures (i.e., "storage systems"). Typically, the storage systems are designed to meet high bandwidth requirements of the HPC systems. Further, such storage systems are subjected to bursty I/O patterns as applications operating on the HPC system alternate between computationally dominant and I/O dominant phases. During computationally dominant phases, the storage systems may experience reduced bandwidth requirements. In contrast, during I/O dominant phases, the bandwidth requirements of the storage system may significantly increase. In theory, it is desirable to utilize a storage system (e.g., parallel file system) that will provide enough bandwidth to sustain a 100% duty cycle burst (i.e., simultaneous burst of all compute nodes) of the HPC system. In such an arrangement, all data output by the HPC system may be simultaneously stored to storage media without blocking or waiting for data to be stored. However, providing a direct-to-primary storage system having a 100% duty cycle typically results in certain inefficiencies and increased costs. Specifically, such storage systems may require numerous (e.g., dozens) of storage systems each having potentially hundreds of storage devices, all of which may be underutilized during computationally dominant phases of the HPC system.

To improve HPC system throughput and thereby reduce blocking or waiting for data to be stored in a more efficient storage system, data may be stored in a tiered system, wherein data is initially stored in an intermediate storage system including high bandwidth storage devices such as Non-Volatile Memory (NVM) and then later written to a primary storage system such as hard disk drives using the architectures described herein. In this way, the NVM of the intermediate storage system serves as a burst buffer. As used herein NVM refers to solid state drives aka silicon storage devices (SSDs), flash memory, NAND-based flash memory, phase change memory, spin torque memory, dual inline memory module (DIMM) memory, non-volatile dual inline memory module (NVDIMM) memory, and other non-volatile storage that may be accessed quickly compared to primary storage such as hard disk drives. The speed to access NVM is typically at least an order of magnitude faster than accessing primary storage.

According to the methods described herein, when the computing nodes of a HPC system output large amounts of data very quickly, the data is initially stored in a burst buffer in the intermediate storage system before the data is stored in primary storage. The hardware and software configurations combined with the methods described allow for increased computing throughput and efficiencies as the computing nodes do not need to wait or block when storing data to the intermediate storage system. Accordingly, these methods substantially reduce or eliminate problems associated with jitter. Further, the number of primary storage devices may be significantly reduced while still providing the necessary bandwidth to provide a 100% duty cycle.

FIG. 1 is a block diagram of an architecture in which aspects of the present disclosure may be implemented. The exemplary architecture includes a primary data storage system 120, a temporary or intermediate storage system 130 and a HPC system 100 each coupled via a High Speed Interconnect (HSI) 110. The HSI 110 may conform to the INFINIBAND, CASCADE, GEMINI architecture or standard and their progeny, may be an optical fiber technology, may be proprietary, and the like. The HPC system 100 includes a plurality of computing nodes 102. Each computing node has at least one core and may have multiple cores, such as 2, 4, 8, 32, etc. The computing nodes may be in one or more racks, shelves or cabinets, or combinations thereof. The total number of nodes is dependent on the configuration of the HPC system 100.

The primary data storage system 120, in the present embodiment, is a parallel file system that may be deployed in shared-disk or shared-nothing distributed parallel mode. In the present embodiment, the primary data storage system 120 provides block storage for the data originating from the HPC system 100. The parallel file system typically includes multiple storage subsystems 122 that are independent of one another. Each storage subsystem 122 typically includes one or more controllers 126 as well as a plurality of individual storage devices 124. The storage subsystems 122 may be separated geographically, may be in the same location, may be in separate racks, may be in separate buildings on a shared site, may be on separate floors of the same building, and arranged in other configurations.

The storage subsystems 122 of the primary storage system 120 (e.g., parallel file system) are connected to the intermediate storage system 130 and communicate with each other over one or more networks which may include the HSI 110 or other networks. These networks may be local area networks, wide area networks, or a combination of these and may include wire lines, optical fiber cables, wireless communication connections, and others. Accordingly, such a network may include networking devices such as routers, hubs, switches and the like. The storage subsystems 122 may augment or enhance the capabilities and functionality of the data storage system by promulgating policies, tuning and maintaining the system, and performing other actions.

The term data as used herein includes a multiple bits, multiple bytes, multiple words, a block, a stripe, a file, a file segment, or other grouping of information. As used herein, the term data is inclusive of entire computer readable files or portions of a computer readable file. The computer readable file may include or represent text, numbers, data, images, photographs, graphics, audio, video, computer programs, computer source code, computer object code, executable computer code, and/or a combination of these and similar information.

The primary storage system 120 and intermediate storage system 130 include computing devices that include software that perform some of the actions described herein. These computing devices may include one or more of logic arrays, memories, analog circuits, digital circuits, software, firmware, and processors such as microprocessors, field programmable gate arrays (FPGAs), application specific integrated circuits (ASICs), programmable logic device (PLDs) and programmable logic array (PLAs). The hardware and firmware components of the devices may include various specialized units, circuits, software and interfaces for providing the functionality and features described herein. The processes, functionality and features described herein may be embodied in whole or in part in software and/or may be in the form of one or more of firmware, an application program, object code, machine code, an executable file, an applet, a COM object, a dynamic linked library (DLL), a dynamically loaded library (.so), a script, one or more subroutines, or an operating system component or service, and other forms of software. The hardware and software and their functions may be distributed such that some actions are performed by a controller or server, and others by other controllers 126 or servers in the data storage system 120 and/or intermediate storage system 130.

A computing device as used herein refers to any device with a processor, memory and a storage device that may execute instructions such as software including, but not limited to, server computers. The computing devices may run an operating system, including, for example, versions of the Lustre, Linux, Unix, MS-DOS, MICROSOFT® Windows, Solaris, Symbian, Android, Chrome, and APPLE® Mac OS X operating systems. Computing devices may include a network interface in the form of a card, chip or chip set that allows for communication over a wired and/or wireless network. The network interface may allow for communications according to various protocols and standards, including, for example, versions of SAS, Ethernet, INFINIBAND network, Fibre Channel, and others.

Each of the storage systems 120, 130 typically includes a plurality of individual storage devices 124, 134, such as rotating media/disks and/or other types of storage devices (e.g., solid state drives, optical storage, tape storage, semiconductor storage, magnetic tape, or other similar storage media). Such storage devices or media may be arranged according to any of a variety of techniques including one or more logical units (LUNs). One exemplary storage subsystem is set forth in co-owned U.S. patent application Ser. No. 13/80,116, the entire contents of which is incorporated herein by reference. The storage systems can be configured to employ any of a number of storage management schemes, such as a RAID storage management system (e.g., Raid 0, 5, 6 etc.). However, the presented embodiments are not limited to RAID configurations or any particular RAID configuration.

The storage devices 124, 134 may be of the same capacity, may have the same physical size, and may conform to the same specification, such as, for example, a hard disk drive specification. Example sizes of storage devices include, but are not limited to, 2.5" and 3.5". Example hard disk drive specifications include Serial Attached Small Computer System Interface (SAS), Serial Advanced Technology Attachment (SATA), Ethernet, PCIe and others. In some embodiments, the physical size of the media in the storage devices may differ.

The storage devices 124, 134 may be included in a single cabinet, rack, shelf or blade. When the storage devices 124, 134 are included in a single cabinet, rack, shelf or blade, they may be coupled with a backplane. A controller may be included in the cabinet, rack, shelf or blade with the storage devices. The backplane may be coupled with or include the controller. The controller may communicate with and allow for communications with the storage devices according to a storage media specification, such as, for example, a hard disk drive specification. The controller may include a processor, volatile memory and non-volatile memory. The controller may be a single computer chip such as an FPGA, ASIC, PLD and PLA. The controller may include or be coupled with a network interface.

The rack, shelf or cabinet containing the storage devices may include a communications interface that allows for connection to other storage devices, a computing device and/or to a network. The communications interface may allow for the transmission of and receipt of information according to one or more of a variety of wired and wireless standards, including, for example, but not limited to, universal serial bus (USB), IEEE 1394 (also known as FIREWIRE® and I.LINK®), Fibre Channel, Ethernet, WiFi (also known as IEEE 802.11). The backplane or controller in a rack or cabinet containing storage devices may include a network interface chip, chipset, card or device that allows for communication over a wired and/or wireless network.

In some embodiments, files and other data may be partitioned into smaller portions and stored as multiple blocks among multiple storage devices associated with a storage system. The data may be stored among storage devices according to the storage policy specified by a storage policy identifier. Various policies may be maintained and distributed or known to the storage systems 120, 130.

The storage systems 120, 130 may provide for one or multiple kinds of storage replication and data resiliency. The data storage systems described herein may operate as a fully replicated distributed data storage system in which all data is replicated such that all copies of stored data are available from and accessible. Replication may be performed synchronously, that is, completed before the write operation is acknowledged; asynchronously, that is, the replicas may be written before, after or during the write of the first copy; or a combination of each. This configuration provides for a high level of data resiliency.

The intermediate storage system 130 includes a plurality of parallel burst engines 132, one or more burst engine servers 136 and an array of storage devices 134. The burst engines 132 are configured to provide independent bandwidth to/from compute nodes 102 of the HPC system 100. In this regard, each burst engine 132 is configured to have a I/O capacity that matches or exceeds the aggregate I/O rate of the compute node(s) 102 directly connected to the burst engine. By matching or exceeding the aggregate I/O rate of the compute node(s), problems associated with congestion (e.g., jitter) are substantially reduced or eliminated. Further, each burst engine 132 has access to a sufficient number of storage devices 134 in the storage array to saturate the link to the compute node 102. Stated otherwise, each burst engine 132 is operative to receive data from the compute node(s) 102 and store this data in high bandwidth storage devices 134 (e.g., solid state drives SSDs) assigned to the burst engine 132. The overall data transfer rate of the high bandwidth storage devices 134 assigned to the burst engine 132 is at least equal to the I/O rate of the compute node(s) 102 connected to the burst engine 132. In this regard, the data is transferred from the burst engine 132 to the storage devices 134 without blocking or waiting. Once stored to the storage devices, the burst buffer server 136 is operative to transfer the data from the storage devices 134 of the intermediate storage array to the primary storage system 120. More detailed operation of the intermediate storage system and transfer of the data to the primary storage system 120 is discussed below.

Figure 2:
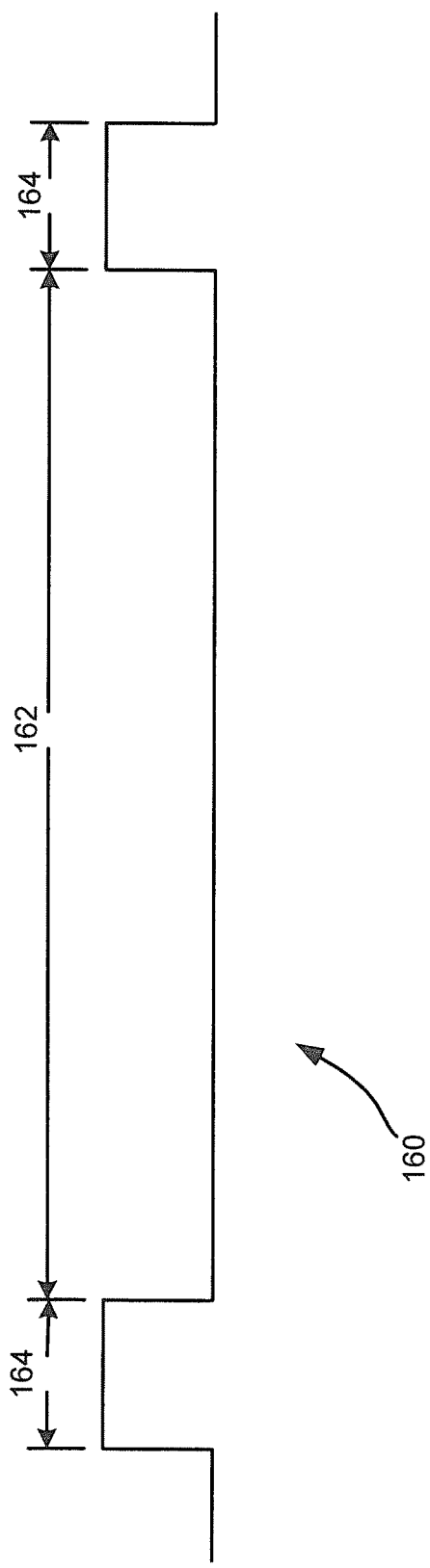
FIG. 2 illustrates an exemplary output profile of a compute node.

FIG. 2 illustrates an exemplary output profile 160 of a compute node. As shown, the output profile 160 of the compute node alternates between a computationally dominant phases 162 and I/O dominant phases (i.e., burst phases). More specifically, when memory of the compute node reaches a predetermined threshold (e.g., 80%) a checkpoint operation dumps accumulated data resulting in the high output transfer or burst 164. Between such bursts 164, during the computationally dominant phase 162, the compute node performs calculations of the application running on the node. During this phase, the output of the compute node is a fraction of that during the burst phase. The ratio of compute phases to. I/O phases or burst phases varies by application and HPC system. For purposes of discussion herein, a ratio of 7:1 is assumed where a compute phase 162 is estimated to last seven times longer than the burst phase 164. The following description of the intermediate storage system is based on this ratio. However, it will be appreciated that the system may be configured for other ratios and that the following description is presented by way of example and not by way of limitation.

In any embodiment, the existence of a computationally dominant phase 162 between burst phases 164 allows for transferring data between an intermediate storage system and a primary storage system at a slower data transfer rate. That is, if a ratio of 7:1 exists between phases, the transfer of data from the intermediate storage system 130 to the primary storage system 120 may occur at a data transfer rate that is up to seven times slower than the transfer rate between the compute node 102 and the intermediate storage system 130 while allowing full transfer of data to primary storage 120 before a subsequent burst phase. Accordingly, this allows for reduced bandwidth between the intermediate storage system 130 and the primary storage system 120 as well as allowing use of fewer storage subsystems 122 in the primary storage system 120.

Figure 3:
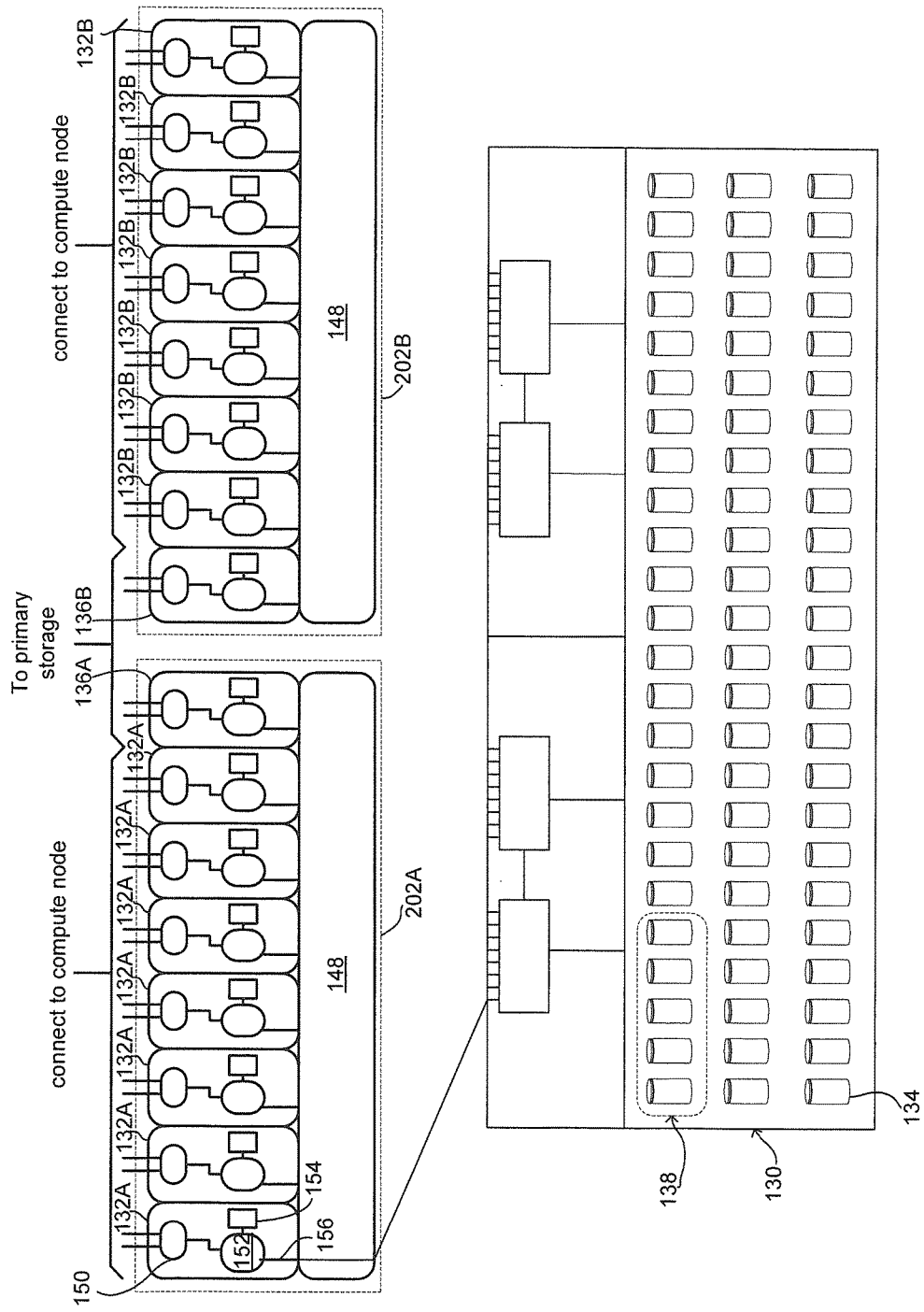
FIG. 3 illustrates an intermediate storage system.

FIG. 3 illustrates one embodiment of the intermediate storage system 130. As shown, the intermediate storage system 130 includes a burst buffer head 202 having two sets of seven burst engines 132A, 132B (hereafter 132) and two burst buffer servers 136A, 136B (hereafter 136). The burst engines 132 and burst buffer servers 136 are connected to an array of intermediate storage devices 134. (Not all connections shown for clarity). In the illustrated embodiment, the burst buffer servers 136A, 136B form part of the burst buffer head 202. However, it will be appreciated that the burst buffer servers may be separate from the burst buffer head 202. Further, in the present embodiment, a power supply and/or backend expander 148 is shown. In this exemplary embodiment, the intermediate storage system 130 is configured for use with commercial HPC systems, which typically have fewer compute nodes that transfer data at higher rates in comparison with larger HPC systems. In one specific embodiment, the burst engines 132 of the intermediate storage system 130 are configured for connection with compute nodes that output data at a rate of approximately 5 GB/S during the burst phase. In such an arrangement, the burst engines 132 have a data input capacity that matches or exceeds the output rate of the compute nodes and the ratio of burst engines to compute nodes may be 1:1. However, it will be appreciated that other ratios are possible and within the scope of the present disclosure. For instance, in a HPC system with compute nodes having a compute node transfer rate of approximately 350 MB/s, a ratio of compute nodes to a burst engine having a 5 GB/S input rate may be 14:1.

Each burst engine 132 is a separate I/O controller having internal processing and memory. As shown, each burst engine 132 includes a front end interface 150 a controller 152, an internal memory/cache 154 and a back end interface 156. Generally, the burst engines 132 are operative to receive data from one or more directly connected compute nodes via a front end interface 150, for instance via an IB, Ethernet, PCIe or other protocol, and write that data to the intermediate storage devices 134 assigned to the burst engine 132 via a back end interface 156, for instance via an SCSI, FC, SAS, Ethernet, PCIe or other protocol. Software supported by the burst engine allows the burst engine 132 to write the data to the intermediate storage devices 134 with redundancy. In one embodiment, the burst engines provide RAID redundancy when writing the data to the intermediate storage devices 134. That is, the controller is operative to perform XOR or other redundancy processing of the received data. Such redundancy processing may be performed by hardware and/or software supported by the controller. The burst engines 132 as well as the burst buffer serves 136, in the current embodiment, utilize LSI Invader controllers available from LSI Corporation of San Jose, Calif. However, the presented inventions are not limited to any specific controller.

To improve the data transfer rate or bandwidth between the burst engines 132 and the intermediate storage devices 134, each burst engine 132 is connected to a dedicated subset of the intermediate storage devices 134. That is, the intermediate storage devices are each accessed directly as an independent drive or RAID/redundancy set by the burst engines 132, which view the intermediate storage devices as a shared-nothing configuration. In contrast, the burst buffer server(s) 136 view the intermediate storage devices in a shared-everything configuration to allow retrieval of the data from all of the intermediate storage devices. In one embodiment, the storage devices form an array of SSDs in a JBOD configuration. In another embedment, the storage devices form a RAID array. As noted, the combined data transfer rate of the dedicated storage devices 134 of a burst engine 132 is selected to saturate the link between the burst engine and the compute node. For instance, in an exemplary embodiment where a burst engine is connected to a compute node having a 5 GB/S transfer rate, a set of five 1 GB/S solid state drives (SSDs) 138 may be dedicated to the burst engine to at least match the data transfer rate of the compute node. However, an additional drive(s) may be dedicated to each burst engine when parity/redundancy is provided to account for any parity overhead. Further, the use of directly accessible storage devices eliminates the need of any intermediate storage controller for the storage array, which may reduce bandwidth between the burst engine and storage devices.

In the exemplary embodiment, the burst buffer head 202 includes fourteen burst engines 132 that are each connectable to compute nodes each having a data transfer rate of 5 GB/S. Accordingly, the burst buffer head 202 has an aggregate input rate of 70 GB/S. In this embodiment, an array of 72 1 GB/S storage devices 134 are utilized to provide an aggregate output rate of over 70 GB/S. That is, five storage devices 134 are assigned to each burst engine 132. Any unassigned storage devices may be utilized as spares in the event of failure of an assigned storage device.

In the illustrated embodiment, the "A" side burst buffer 136A services the "B" side burst engines 132B and the "B" side bursts buffer server 136B services the "A" side bursts engines 132A. Such an arrangement enhances redundancy such that there is no single point of failure. In a further arrangement, each compute node may be connected to a burst engine on both the "A" and "B" sides of the burst buffer head 202 to provide further redundancy. Such an arrangement reduces the aggregate capacity of the burst buffer head by one-half In any arrangement, if the aggregate input capacity of a single burst buffer head 202 does not equal or exceed the aggregate output capacity of the HPC, additional burst buffer heads and associated intermediate storage arrays may be utilized. That is, the intermediate storage system 130 is scalable to the requirements of a HPC system.

Once the burst buffers have written the data to the assigned intermediate storage devices, the burst buffer server 136 operates to extract the data from the intermediate storage devices 134 and replay the data to the primary storage system 120. In this regard, the burst buffer server 134 has access to each of the storage devices 134 in the intermediate storage system 130.

Figure 4:
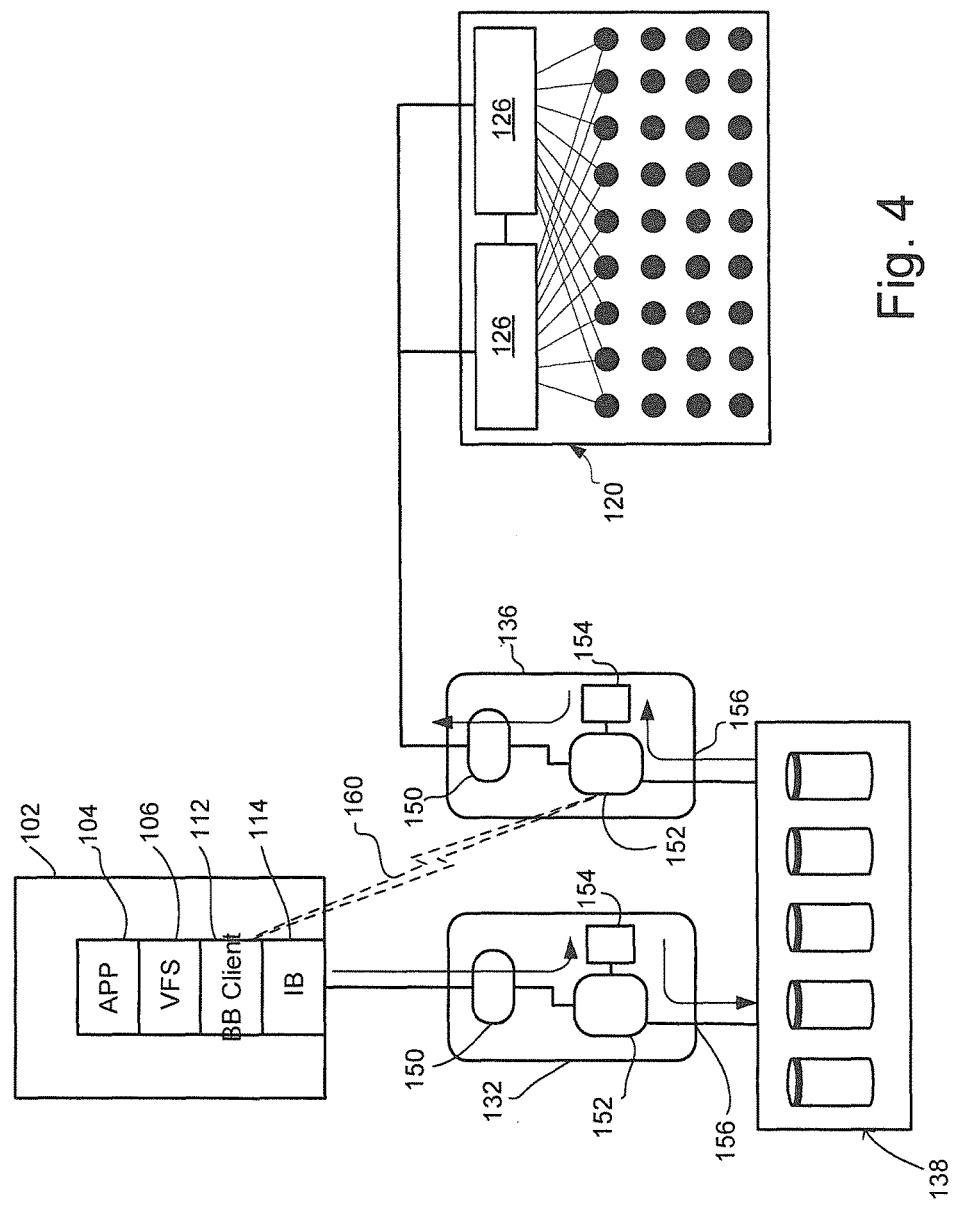
FIG. 4 illustrates transfer of data from a compute node to a primary storage system via an intermediate storage system.

FIG. 4 details the transfer of data between a compute node 102 and a primary storage system 120 via an intermediate storage system 130 in accordance with the present disclosure. To increase the burst output rate of the compute node 102, the present disclosure utilizes a client 112 (e.g., burst buffer client) that resides on the compute node 102. This client 112 is operative to capture data at the file level and output this file level data and associated metadata to the connected burst engine 132. During operation, the application 104 of the compute node outputs data to a client 112 which, in the present embodiment, emulates a Lustre file system. However, other file systems may be utilized. A virtual file system 106 (VFS) may bridge between the application 104 and the burst buffer client 112. The burst buffer client stores file data, metadata, such as filenames, directories, access permissions, and file layout to a block storage device (intermediate storage devices) in a format known to the client 112 and the burst buffer server. That is, the burst buffer client 112 knows what LBA addresses the burst buffer client 112 has access to within the intermediate storage system 130 (e.g., the storage devices 138 assigned to the burst engine 132 directly connected to the compute node 102) and writes the file level data and associated metadata to these LBA addresses in a known format. Once written, the burst buffer client 112 notifies the burst buffer server 136 that data has been written to the intermediate storage devices 138 and the location of where the data was written. The burst buffer server is then operative to retrieve the data, interpret the metadata and replay the data to the primary storage system 120 in accordance with the metadata and known format.

In the illustrated embodiment, the file level data is output via a high band width port 114 (e.g., IB) to the burst engine 132. The burst engine 132 receives the file level data and associated metadata and writes this data to the intermediate storage devices 134 assigned to the burst engine. The data is cached to internal memory 154 and software supported by the burst engine controller 152 and/or dedicated hardware allows writing the received file level data to the storage devices 134 with redundancy. In one embodiment, a RAID redundancy (e.g., RAID 4, RAID 5, etc) is utilized. However, other redundancy methods may be implemented. In the present embodiment, the file level data and associated metadata received from the compute node 102 is written as block level data in the intermediate storage devices 134. In this regard, the burst engine forms a block interface to the compute node 102.

Once the data is written to the intermediate storage devices 134 the burst buffer client 112 communicates with the burst buffer server 136 over a data connection 160 to notify the burst buffer server 136 that data has been written to the intermediate storage devices and to identify where the data is located (e.g., LBA addresses). The burst buffer server 136 utilizes this information to extract the block level data stored on the intermediate storage devices 138. Upon extraction, the burst buffer server 136 is operative to interpret the metadata and transfer the data to the primary storage system 120 in accordance with the metadata. In one embodiment, the burst buffer server transfers the data via a primary storage system client (e.g., parallel file system client). In various embodiments, the primary storage system client may be a Lustre client, GPFS client, CEPH client or other parallel file system client. That is, the metadata identifies where the data retrieved from the intermediate storage devices 138 is to be replayed/stored to the primary storage system 120. As noted above, replaying this data may be performed at a reduced transfer rate during a computationally intensive phase of the compute node.

Figure 5:
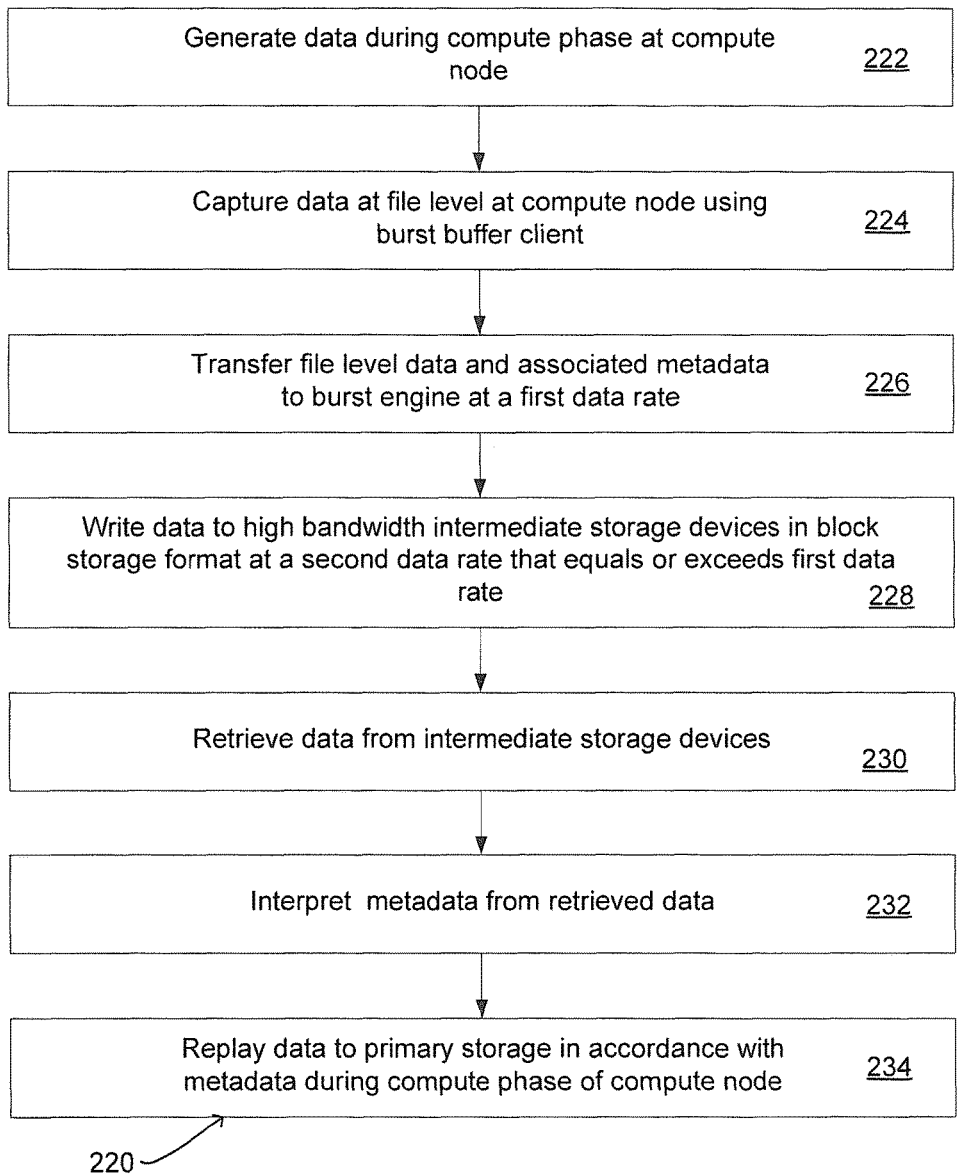
FIG. 5 is a process flow chart of an overall process for transferring data between the HPC and primary storage system via an intermediate storage system.

FIG. 5 is a flowchart of the overall process 220 of transferring data between the HPC and the primary storage system via the intermediate storage system. Initially, data is generated 222 during compute phase of the compute node of the HPC. This data is captured 224 at the file level at the compute node using the burst buffer client during the burst output phase of the HPC. The file level data and associated metadata is transferred 226 to the burst engine at a first data rate. As noted above, the first data rate is dependent on the specific HPC system utilized. The burst engine then writes 228 the file level data to high-bandwidth intermediate storage devices in a block level format at a second data rate that equals or exceeds the first data rate. As noted above, in conjunction with such writing, the burst engine may additionally perform redundancy calculations such that the data is redundantly written to the intermediate level storage devices. Once written to the intermediate level storage devices, this data is retrieved 230 from the intermediate storage devices by the burst buffer server which communicates with the burst buffer client to identify the location of the data as written to the intermediate storage devices. In addition, the burst buffer server interprets 232 metadata from the retrieved block level data to identify where the data is to be written in the primary storage system. At this time, the burst buffer server replays 234 the data to the primary storage system.

Figure 6:
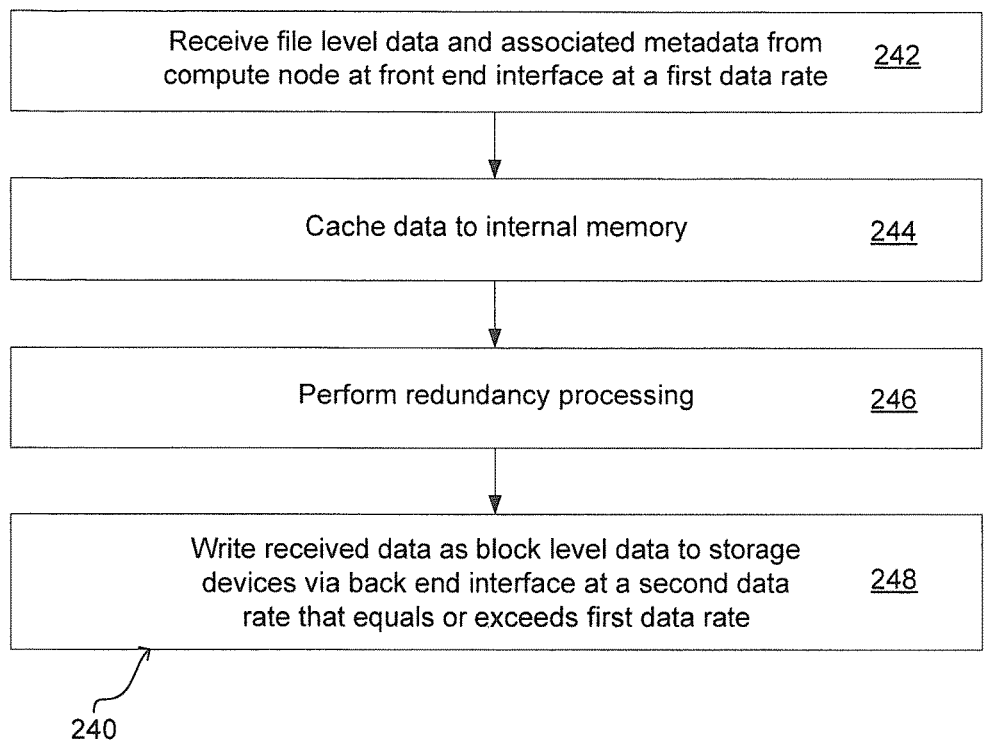
FIG. 6 is process flow chart of a process performed by a burst engine.

FIG. 6 is a flowchart of a process 240 performed by the burst engines of the burst buffer head. Initially, the burst engine receives 242 file level data and associated metadata from a compute node via a front end interface. As noted above various different protocols may be utilized at the front end interface including, without limitation, IB. As the data is received, it is cached 244 to internal memory. In the present embodiment, the data is redundancy processed (e.g., XOR) and then written 246 as block level data to the intermediate storage devices assigned to the burst engine via a backend interface.

Figure 7:
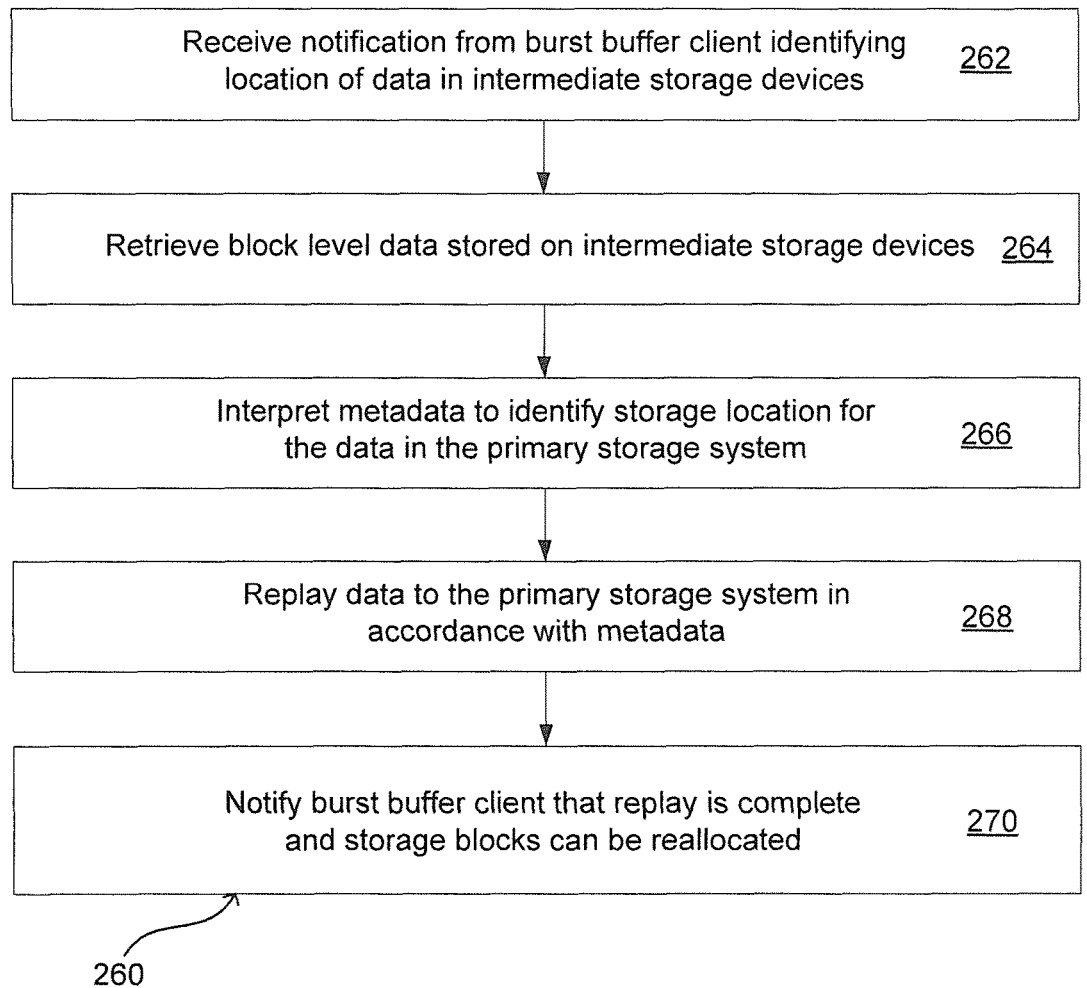
FIG. 7 is process flow chart of a process performed by a burst buffer server.

FIG. 7 is a flowchart of a process 260 performed by the burst buffer server. Initially, the burst buffer server is notified 262 by the burst buffer client at the compute node that data has been stored in the intermediate storage devices assigned to the burst engine connected to the compute node. Based on location information received from the client, the burst buffer server retrieves 264 the block level data from the intermediate storage devices and interprets 266 the metadata to identify where the data is to be stored in the primary storage system. The burst buffer server then replays 268 that data to the primary storage devices in accordance with the metadata. Once written to the primary storage system, the burst buffer server is operative to notify 270 the burst buffer client that the data has been written to the primary storage system and that the intermediate storage devices are available for the next burst output from the compute node. That is, the burst buffer server is operative to notify the burst buffer client that the blocks of the intermediate storage device can be reallocated.

Though discussed above primarily in terms of writing data to the primary storage system via the intermediate storage system, it will be further appreciated that the presented systems and methods also allow for reading data from the intermediate storage system and/or the primary storage system. In a read operation, the compute node may initially determine where the data resides. That is, if the data has not been replayed to the primary storage system, the compute node may read data directly from the intermediate storage system. If the data has been replayed to the primary storage system, the compute node may read data from the primary storage system, which may be performed free of the intermediate storage system.

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments. Consequently, variations and modifications commensurate with the above teachings, and skill and knowledge of the relevant art, are within the scope of the presented disclosure. It is intended that the appended claims be construed to include alternative embodiments to the extent permitted by the prior art.

What is claimed is:

1. A method for transferring data from at least a first compute node of a high performance computing (HPC) system, the method comprising:
    capturing file level data output during a burst output phase at a software client supported at a compute node of a HPC system;
    transferring said file level data and associate metadata, via an I/O node of said compute node, at a first data transfer rate to a temporary storage system;
    receiving, from said compute node, file level data and associate metadata, via a front-end interface of a burst engine of said temporary storage system, at said first data transfer rate;
    caching said file level data and associated metadata at an internal memory of said temporary storage system;
    writing said file level data and associated metadata as block level data, via a back-end interface of said burst engine, to a set of dedicated non-volatile storage devices of said temporary storage system, where an aggregate data transfer rate of said set of storage devices equals or exceeds said first data transfer rate;
    receiving a notification at a server, supported at said temporary storage system, from said software client at the compute node of the HPC system, said notification including logical block addresses of the block level data stored in the dedicated non-volatile storage devices of the temporary storage system;
    retrieving block level data from said storage devices at said server;
    interpreting said metadata at said server; and
    replaying said block level data from said temporary storage system to a second storage system, in accordance with said metadata, at a second data transfer rate that is less than said first data transfer rate, wherein said block level data is replayed during a compute phase of said compute node of said HPC system.

2. The method of claim 1, wherein replaying said block level data further comprises said server negotiating with said compute node to identify block level storage locations of said file level data.

3. The method of claim 1, wherein writing said file level data as block level data further comprises:
    writing said block level data with redundancy to said storage devices.

4. The method of claim 3, wherein writing said block level data with redundancy further comprises:
    writing said block level data with RAID redundancy.

5. The method of claim 3, further comprising:
    performing a XOR operation prior to writing said block level data to said storage devices.

6. The method of claim 1, further comprising:
    said server notifying said compute node that said storage devices are available upon completing replay of said block level data to said second storage system.

7. The method of claim 1, wherein capturing file level data further comprises:
capturing data at file level at said compute node using a burst buffer client.

* * * * *